(12) United States Patent
Lin et al.

(10) Patent No.: US 11,580,776 B2
(45) Date of Patent: Feb. 14, 2023

(54) UNDER-SCREEN FINGERPRINT SENSING DEVICE AND FINGERPRINT SENSING METHOD

(71) Applicant: Egis Technology Inc., Hsinchu (TW)

(72) Inventors: Kuan-Yi Lin, Hsinchu (TW); Chen Yang, Hsinchu (TW); Po-Chiang Hsieh, Hsinchu (TW); Pei-Shan Liu, Hsinchu (TW)

(73) Assignee: Egis Technology Inc., Hsinchu (TW)

( * ) Notice: Subject to any disclaimer, the term of this patent is extended or adjusted under 35 U.S.C. 154(b) by 0 days.

(21) Appl. No.: 17/683,378

(22) Filed: Mar. 1, 2022

(65) Prior Publication Data

US 2022/0292873 A1  Sep. 15, 2022

Related U.S. Application Data

(60) Provisional application No. 63/155,742, filed on Mar. 3, 2021.

(30) Foreign Application Priority Data

Jan. 12, 2022 (CN) .......................... 202210032459.4

(51) Int. Cl.
*G06V 40/12* (2022.01)
*G06V 40/13* (2022.01)
(Continued)

(52) U.S. Cl.
CPC .......... *G06V 40/1388* (2022.01); *G06V 10/56* (2022.01); *G06V 40/1318* (2022.01); *G06V 40/40* (2022.01)

(58) Field of Classification Search
CPC . G06V 40/1388; G06V 10/56; G06V 40/1318
See application file for complete search history.

(56) References Cited

U.S. PATENT DOCUMENTS

| | | |
|---|---|---|
| 7,010,148 B2 | 3/2006 | Irving et al. |
| 7,133,541 B2 | 11/2006 | Haselsteiner et al. |

(Continued)

FOREIGN PATENT DOCUMENTS

| | | |
|---|---|---|
| CN | 103077377 | 5/2013 |
| CN | 104392227 | 2/2018 |

(Continued)

OTHER PUBLICATIONS

"Office Action of Taiwan Counterpart Application", dated Oct. 12, 2022, p. 1-p. 8.

*Primary Examiner* — Premal R Patel
(74) *Attorney, Agent, or Firm* — JCIPRNET

(57) ABSTRACT

An under-screen fingerprint sensing device and fingerprint sensing method are provided. The under-screen fingerprint sensing device includes a fingerprint sensor and a processor. The processor performs a first FFC on a first color original value, a second color original value, and a third color original value provided by the fingerprint sensor to determine whether a target object is a real finger. When the processor determines that the target object is an unreal finger, the processor performs a second FFC on the first color original value, the second color original value, and the third color original value to determine again whether the target object is the real finger.

23 Claims, 6 Drawing Sheets

(51) Int. Cl.
*G06V 10/56* (2022.01)
*G06V 40/40* (2022.01)

(56) References Cited

U.S. PATENT DOCUMENTS

| | | | |
|---|---|---|---|
| 10,810,404 | B2 | 10/2020 | Rowe et al. |
| 2018/0107858 | A1* | 4/2018 | Chen ................. G06V 40/1365 |
| 2020/0302143 | A1 | 9/2020 | Vogel et al. |
| 2020/0401782 | A1 | 12/2020 | Cheng et al. |
| 2022/0050990 | A1* | 2/2022 | Chu ................... G06V 40/1318 |

FOREIGN PATENT DOCUMENTS

| | | |
|---|---|---|
| CN | 109657606 | 4/2019 |
| CN | 110472518 | 11/2019 |
| CN | 111476215 | 7/2020 |
| CN | 111837128 | 10/2020 |
| CN | 112069942 | 12/2020 |
| CN | 112183483 | 1/2021 |
| CN | 112232213 | 1/2021 |
| TW | 201506807 | 2/2015 |
| TW | I549065 | 9/2016 |
| TW | 201635193 | 10/2016 |
| TW | I604390 | 11/2017 |
| TW | 201941018 | 10/2019 |
| TW | 201944275 | 11/2019 |
| TW | I709918 | 11/2020 |
| TW | M605327 | 12/2020 |

* cited by examiner

# UNDER-SCREEN FINGERPRINT SENSING DEVICE AND FINGERPRINT SENSING METHOD

CROSS-REFERENCE TO RELATED APPLICATION

This application claims the priority benefit of U.S. application Ser. No. 63/155,742, filed on Mar. 3, 2021, and China application serial no. 202210032459.4, filed on Jan. 12, 2022. The entirety of each of the above-mentioned patent applications is hereby incorporated by reference herein and made a part of this specification.

BACKGROUND

Technical Field

The present disclosure relates to a biometric sensing technology, and more particularly, to an under-screen fingerprint sensing device and a fingerprint sensing method.

Description of Related Art

Currently, fingerprint sensing technology has been applied in various electronic devices to provide an identity recognition function for security. However, when others use fake fingers for fingerprint sensing, the current fingerprint sensing technology is unable to effectively differentiate the real finger from the fake finger. In addition, in the process of fingerprint sensing, when the sensing environment changes, the current fingerprint sensing technology is also easily affected by the change of the sensing environment, which makes it impossible to correctly differentiate the real finger from the fake finger.

SUMMARY

In view of this, the present disclosure provides an under-screen fingerprint sensing device and a fingerprint sensing method, which can effectively determine whether the target object for fingerprint sensing is a real finger.

The under-screen fingerprint sensing device of the present disclosure is adaptable for electronic equipment with a display device. The under-screen fingerprint sensing device includes a fingerprint sensor and a processor. The fingerprint sensor is arranged below the display device. The fingerprint sensor has a pixel array. The pixel array has a first color pixel, a second color pixel, and a third color pixel. When the fingerprint sensor senses the target object, the first color pixel, the second color pixel and the third color pixel output the first color original value, the second color original value and the third color original value respectively. The processor is coupled to the fingerprint sensor. The processor performs a first flat-filed correction (FFC) on the first color original value, the second color original value and the third color original value, to generate the first color correction value, the second color correction value and the third color correction value. The processor determines whether the target object is a real finger according to the first color correction value, the second color correction value and the third color correction value. When the processor determines that the target object is an unreal finger according to the first color correction value, the second color correction value and the third color correction value, the processor performs a second FFC on the first color original value, the second color original value, and the third color original value, to generate a fourth color correction value, a fifth color correction value and a sixth color correction value. The processor determines again whether the target object is a real finger according to the fourth color correction value, the fifth color correction value and the sixth color correction value.

The fingerprint sensing method of the present disclosure includes the following steps. When the fingerprint sensor senses the target object, the first color pixel, the second color pixel and the third color pixel of the pixel array of the fingerprint sensor output the first color original value, the second color original value and the third color original value, respectively. The first color original value, the second color original value and the third color original value are subjected to the first FFC to generate the first color correction value, the second color correction value and the third color correction value. It is determined whether the target object is a real finger according to the first color correction value, the second color correction value and the third color correction value. When the processor determines that the target object is a unreal finger according to the first color correction value, the second color correction value and the third color correction value, the second FFC is performed on the first color original value, the second color original value, and the third color original value, to generate a fourth color correction value, a fifth color correction value and a sixth color correction value. It is determined again whether the target object is a real finger according to the fourth color correction value, the fifth color correction value and the sixth color correction value.

Based on the above, the under-screen fingerprint sensing device and the fingerprint sensing method of the present disclosure can perform FFC on the color original values of different colors obtained by the fingerprint sensor, so as to effectively determine whether the target object is a real finger according to the corrected values.

In order to make the above-mentioned features and advantages of the present disclosure more comprehensible, the following examples are given and described in detail with the accompanying drawings as follows.

DESCRIPTION OF THE EMBODIMENTS

Figure 1:
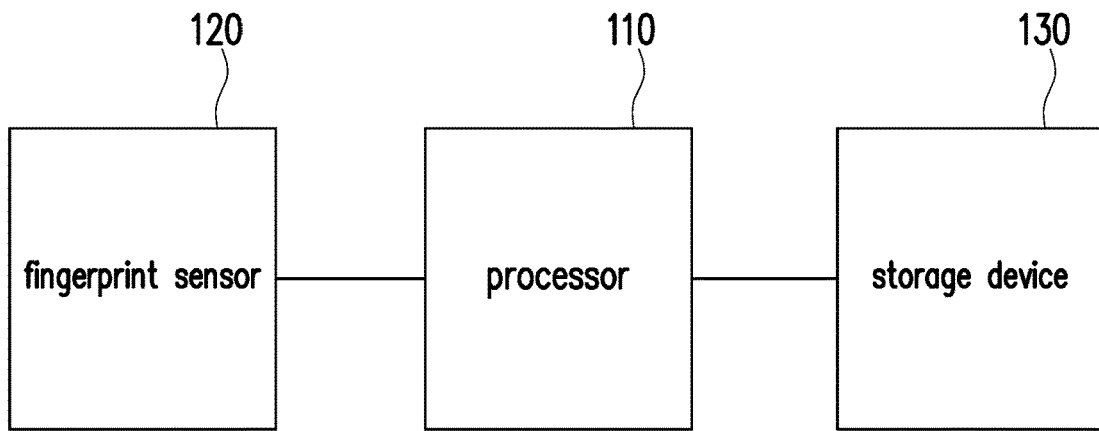
FIG. 1 is a schematic circuit diagram of an under-screen fingerprint sensing device according to an embodiment of the present disclosure.

In order to make the content of the present disclosure more comprehensible, the following specific embodiments are taken as examples by which the present disclosure can indeed be implemented. Additionally, where possible, elements/components/steps using the same reference numerals in the drawings and embodiments represent the same or similar parts.

Figure 2:
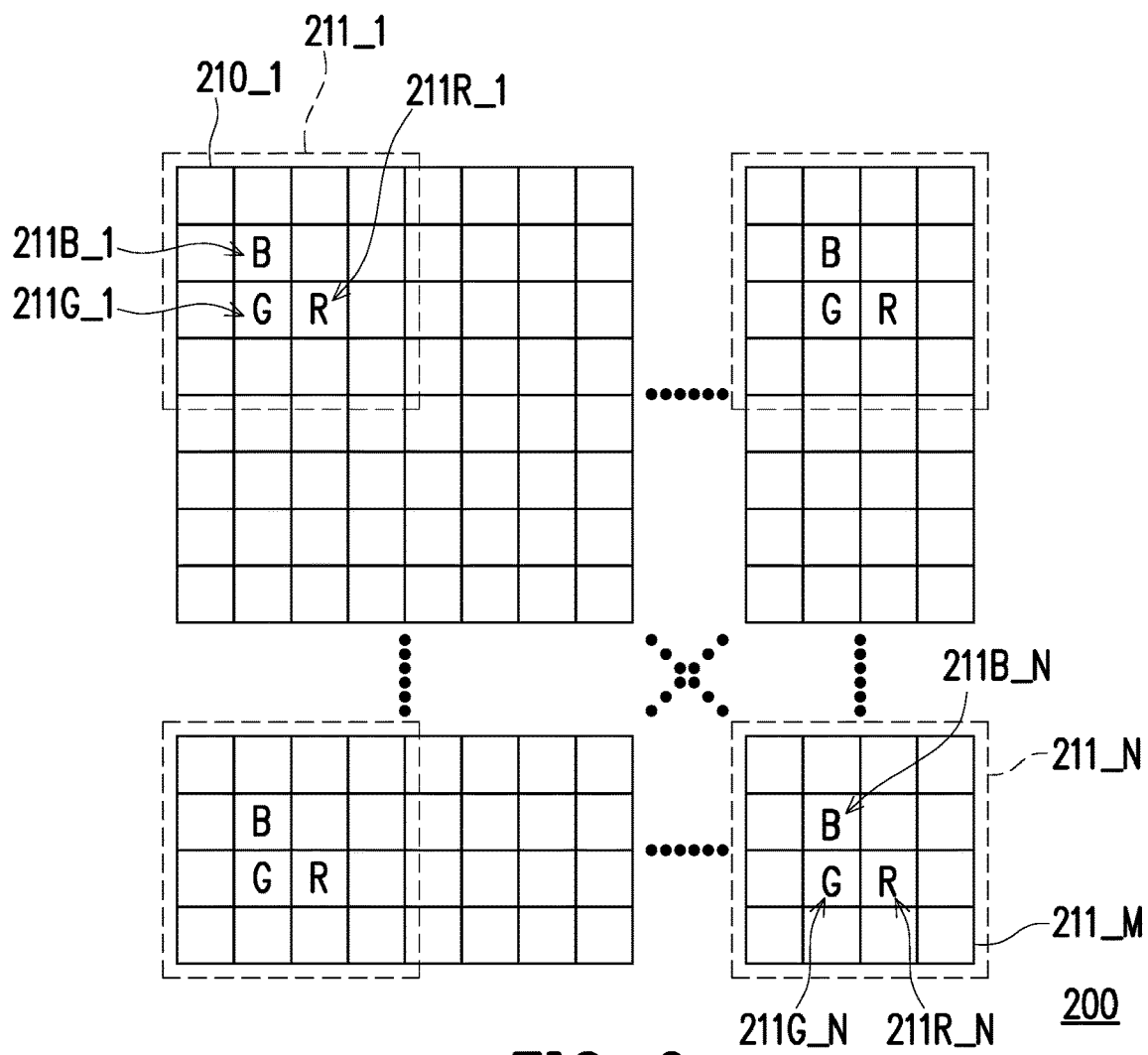
FIG. 2 is a schematic diagram of a pixel array according to an embodiment of the present disclosure.

FIG. 1 is a schematic circuit diagram of an under-screen fingerprint sensing device according to an embodiment of the present disclosure. FIG. 2 is a schematic diagram of a pixel array according to an embodiment of the present disclosure. Referring to FIG. 1 and FIG. 2, the under-screen fingerprint sensing device 100 includes a processor 110, a fingerprint sensor 120 and a storage device 130. The processor 110 is coupled to the fingerprint sensor 120 and the storage device 130. In this embodiment, the under-screen fingerprint sensing device 100 is adaptable for an electronic device (or terminal device) having a display device. The fingerprint sensor 120 may be an optical fingerprint sensor. The fingerprint sensor 120 can be disposed under the display device, and can be used to sense a target object located above the display device. When the under-screen fingerprint sensing device 100 performs fingerprint sensing, the display device of the electronic device or other light source elements disposed under the screen can provide illumination light to the target object, so that the fingerprint sensor 120 can receive the sensing light reflected by the surface (that is, the finger surface) of the target object to generate a fingerprint image.

In this embodiment, the under-screen fingerprint sensing device 100 can be a fingerprint sensing module, and the fingerprint sensing module is integrated in an electronic device with a display device, and the electronic device is, for example, a smart phone. However, the present disclosure is not limited thereto. The processor 110 and the storage device 130 can be a processing chip and a memory provided in the fingerprint sensing module, and can provide the fingerprint image and the determining result of whether the target object is a real finger to the central processing unit of the electronic device, so that the central processing unit of the electronic device performs other subsequent functions or operations according to the fingerprint image and the determining result of whether the target object is a real finger. Alternatively, in an embodiment, the processor 110 may be a processing chip provided in the fingerprint sensing module, and the storage device 130 may be provided in the electronic device. Alternatively, in another embodiment, the under-screen fingerprint sensing device 100 may refer to an electronic device itself with a fingerprint sensing function, and the processor 110 and the storage device 130 may be the central processing unit (or graphics processing unit) and memory of the electronic device.

In this embodiment, as shown in FIG. 2, the fingerprint sensor 120 may include a pixel array 200. The pixel array 200 includes a plurality of pixels 210_1 to 210_M, and M is a positive integer. It should be noted that at least a part of the pixel array 200 can be divided into a plurality of pixel groups 211_1 to 211_N, and N is a positive integer. In this embodiment, the plurality of pixel groups 211_1 to 211_N may include a first color pixel 211R_1 to 211R_N, a second color pixel 211G_1 to 211G_N, and a third color pixel 211B_1 to 211B_N, respectively. In an embodiment, the first color pixel 211R_1 to 211R_N, the second color pixel 211G_1 to 211G_N and the third color pixel 211B_1 to 211B_N respectively include a red color filter, a green filter and a blue filter formed on the light incident surface of various pixels. In this aspect, the first color pixel 211R_1 to 211R_N, the second color pixel 211G_1 to 211G_N, and the third color pixel 211B_1 to 211B_N may be red sensing pixels (R), green sensing pixels (G), and blue sensing pixels (B), respectively.

In this embodiment, when the under-screen fingerprint sensing device 100 performs fingerprint sensing, for example, the first color pixel 211R_1, the second color pixel 211G_1 and the third color pixel 211B_1 can respectively output the sensing results (analog data) to the analog to digital converter (ADC), so that the ADC can output a plurality of corresponding ADC codes (digital data) to the processor 110 as the first color original value (raw data), second color original value, and third color original value. The aforementioned ADC may be provided in the processor 110 or the fingerprint sensor 120. In this embodiment, the storage device 130 may store, for example, the first flattening algorithm and/or the second flattening algorithm. The processor 110 may execute the first flattening algorithm and/or the second flattening algorithm to perform a first flat-filed correction (FFC) and/or a second FFC on the obtained first color original value, second color original value and third color original value.

In this embodiment, the first FFC means that the processor 110 can perform the first FFC on the obtained first color original value (R1), the second color original value (G1) and the third color original value (B1) according to the pre-stored first low reference value (corresponding to the red low reference value Rb), the second low reference value (corresponding to the green low reference value Gb), the third low reference value (corresponding to the blue low reference value Bb), the first high reference value (corresponding to the red high reference value Rs), the second high reference value (corresponding to the green high reference value Gs) and the third high reference value (corresponding to the blue high reference value Bs). In this embodiment, the first low reference value (Rb), the second low reference value (Gb), and the third low reference value (Bb) are three ADC values respectively corresponding to the first color, the second color and the third color and generated after the fingerprint sensor 120 (for example, before shipping from the factory) senses a standard black object (for example: black rubber block) once, or three average ADC values respectively corresponding to the first color, the second color, and the third color and generated after the fingerprint sensor 120 senses the standard black object (for example: black rubber block) for multiple times. The first high reference value (Rs), the second high reference value (Gs), and the third high reference value (Bs) can be three ADC values respectively corresponding to the first color, the second color and the third color generated and generated after the fingerprint sensor 120 (e.g., the fingerprint sensing result performed after shipping from the factory) senses a standard skin-colored object (e.g., skin-colored rubber block) once, or three average ADC values respectively corresponding to the first color, the second color, and the third color and generated after the fingerprint sensor 120 senses the standard skin-colored object (e.g., skin-colored rubber block) for multiple times.

In this embodiment, the processor 110 can execute the following formula (1) to formula (3) to perform the first FFC, so that the processor 110 can obtain the first color correction value (FFC1_R1), the second color correction value (FFC1_G1) and the third color correction value (FFC1_B1). In this embodiment, the processor 110 performs subtraction calculation on the first color original value (R1) and the first low reference value (Rb) to obtain the first calculation value, and the processor 110 performs subtraction calculation on the first high reference value (Rs) and the first low reference value (Rb) to obtain the second calculation value. The processor 110 divides the first calculation value by the second calculation value to obtain the first color correction value (FFC1_R1). The processor 110 performs subtraction calculation on the second color original value (G1) and the second low reference value (Rb) to obtain a third calculation value, and the processor 110 performs subtraction calculation on the second high reference value (Gs) and the second low reference value (Gb) to obtain the fourth calculation value. The processor 110 divides the third calculation value by the fourth calculation value to obtain the second color correction value (FFC1_G1). The processor 110 performs subtraction calculation on the third color original value (B1) and the third low reference value (Gb) to obtain the fifth calculation value, and the processor 110 performs subtraction calculation on the third high reference value (Bs) and the third low reference value (Bb) to obtain the sixth calculation value. The processor 110 divides the fifth calculation value by the sixth calculation value to obtain the third color correction value (FFC1_B1).

$$\frac{R1 - Rb}{Rs - Rb} = FFC1\_R1 \quad \text{Equation (1)}$$

$$\frac{G1 - Gb}{Gs - Gb} = FFC1\_G1 \quad \text{Equation (2)}$$

$$\frac{B1 - Bb}{Bs - Bb} = FFC1\_B1 \quad \text{Equation (3)}$$

In this embodiment, the second FFC means that the processor 110 can perform the second FFC on the obtained first color original value (R1), the second color original value (G1) and the third color original value (B1) according to the pre-stored first low reference value (corresponding to the red low reference value Rb), the second low reference value (corresponding to the green low reference value Gb), the third low reference value (corresponding to the blue low reference value Bb), another first high reference value (corresponding to the red high reference value Rw), another second high reference value (corresponding to the green high reference value Gw) and another third high reference value (corresponding to the blue high reference value Bw). In this embodiment, the first low reference value (Rb), the second low reference value (Gb), and the third low reference value (Bb) are three ADC values respectively corresponding to the first color, the second color and the third color and generated after the fingerprint sensor 120 (for example, before shipping from the factory) senses a standard black object. The first high reference value (Rw), the second high reference value (Gw), and the third high reference value (Bw) can be three ADC values respectively corresponding to the first color, the second color, and the third color and generated after the fingerprint sensor 120 (for example, before shipping from the factory) senses a standard white object once or three average ADC values obtained from sensing the standard white object multiple times.

In this embodiment, the processor 110 can execute the following equations (4) to (6) to perform the second FFC, so that the processor 110 can obtain another first color correction value (FFC2_R1), another second color correction value (FFC2_G1) and another third color correction value (FFC2_B1). The detailed descriptions for calculation expressed in the following equations (4) to (6) can be deduced by referring to the descriptions of the above equations (1) to (3), and thus are not repeated here.

$$\frac{R1 - Rb}{Rw - Rb} = FFC2\_R1 \quad \text{Equation (4)}$$

$$\frac{G1 - Gb}{Gw - Gb} = FFC2\_G1 \quad \text{Equation (5)}$$

$$\frac{B1 - Bb}{Bw - Bb} = FFC2\_B1 \quad \text{Equation (6)}$$

In addition, it should be noted that the anti-counterfeiting operation in the following embodiments can be carried out with the numeral analysis and calculation described in the following embodiments based on the sensing results of the respective first color pixel, second color pixel and third color pixel of the plurality of pixel groups 211_1 to 211_N in the pixel array 200. In addition, the processor 110 may count the plurality of determining results of the pixel groups 211_1 to 211_N, and determine the final determining result of the real and fake fingers according to the counting results. For example, if P groups in the pixel groups 211_1 to 211_N determine that the target object is real finger, and if P is greater than a preset threshold, the processor 110 determines that the target object is a real finger. On the contrary, if P is less than or equal to the preset threshold, the processor 110 determines that the target object is a fake finger. The numerical analysis and calculations in the following embodiments are described based on the sensing results of the first color pixel, the second color pixel, and the third color pixel of a single pixel group, and can be analogized to the numerical analysis and calculations of multiple pixel groups 211_1 to 211_N.

Figure 3:
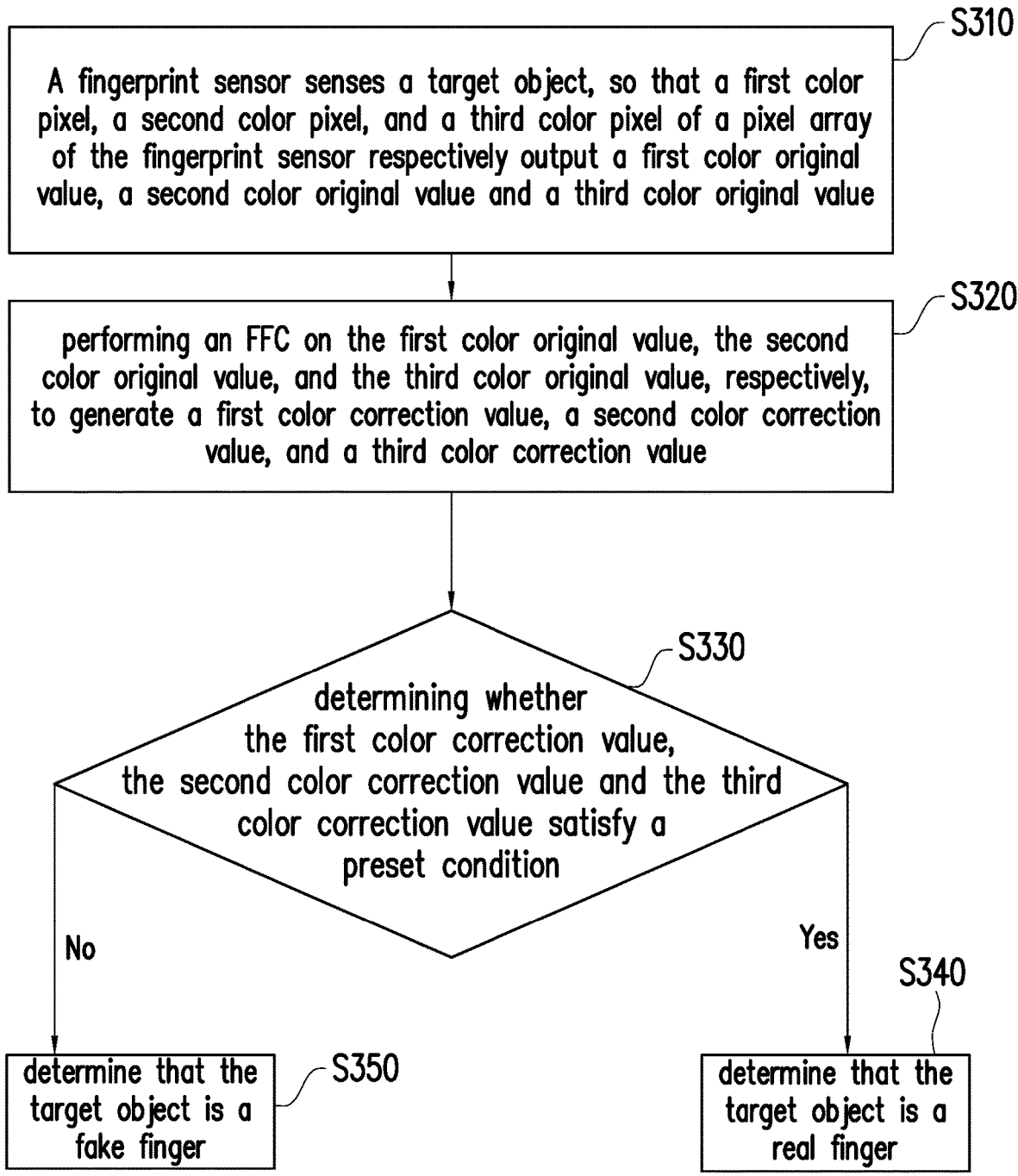
FIG. 3 is a flowchart of the fingerprint sensing method according to the first embodiment of the present disclosure.

FIG. 3 is a flowchart of the fingerprint sensing method according to the first embodiment of the present disclosure. Referring to FIG. 1 to FIG. 3, the under-screen fingerprint sensing device 100 can perform the following steps S310 to S350 to realize the anti-counterfeiting function. In this embodiment, the under-screen fingerprint sensing device 100 executes steps S310 to S350. In step S310, the under-screen fingerprint sensing device 100 can sense the target object through the fingerprint sensor 120, so that the first color pixel 211R_1, the second color pixel 211G_1 and the third color pixel 211B_1 of the pixel array 200 of the fingerprint sensor 120 output the first color original value (R1), the second color original value (G1), and the third color original value (B1) respectively. In step S320, the processor 110 may perform FFC on the first color original value (R1), the second color original value (G1), and the third color original value (B1), respectively, to generate the first color correction value, the second color correction value, and the third color correction value. It is worth noting that, in this embodiment, the processor 110 may perform the aforementioned first FFC or second FFC on the first color original value (R1), the second color original value (G1), and the third color original value (B1), respectively. Alternatively, the processor 110 may simultaneously perform the aforementioned first FFC and second FFC on the first color original value (R1), the second color original value (G1), and the third color original value (B1), respectively, so as to make judgment with the following preset conditions based on the numerical result of two FFCs. In step S330, the processor 110 may determine whether the first color correction value, the second color correction value and the third color correction value satisfy a preset condition. If not, in step S350, the processor 110 determines that the target object is a fake finger, so as to stop using the current fingerprint image for subsequent fingerprint analysis. If yes, in step S340, the processor 110 determines that the target object is a real finger. Therefore, the under-screen fingerprint sensing device 100 and the fingerprint sensing method of the present embodiment can realize the function of judging whether the target object is a real finger.

In this embodiment, the preset condition may, for example, refer to the first numerical analysis method described below. The first numerical analysis method may refer to the processor 110 determining whether the values obtained through dividing the first color correction value by the second color correction value, dividing the second color correction value by the third color correction value, and dividing the first color correction value by the third color correction value are greater than the first threshold and less than the second threshold, respectively.

Take the processor 110 performing the aforementioned first FFC on the first color original value (R1), the second color original value (G1), and the third color original value (B1) as an example. The processor 110 may make judgment through the following equations (7) to (9) on the first color correction value (FFC1_R1), the second color correction value (FFC1_G1) and the third color correction value (FFC1_B1) processed after the first FFC, to judge whether the target object is a fake finger or a real finger. In this aspect, if equation (7) to equation (9) are all satisfied, the target object is determined to be a real finger. If at least one of equation (7) to equation (9) is not satisfied, it is determined that the target object is a fake finger. The parameter TH1 is the first threshold. The parameter TH2 is the second threshold. In an embodiment, the parameter TH1 may be 0.8, and the parameter TH2 may be 1.2.

$$TH1 < \frac{FFC1\_R1}{FFC1\_G1} < TH2 \quad \text{Equation (7)}$$

$$TH1 < \frac{FFC1\_G1}{FFC1\_B1} < TH2 \quad \text{Equation (8)}$$

$$TH1 < \frac{FFC1\_R1}{FFC1\_B1} < TH2 \quad \text{Equation (9)}$$

Take the processor 110 performing the aforementioned second FFC on the first color original value (R1), the second color original value (G1), and the third color original value (B1) as an example. The processor 110 may make judgment through the following equations (10) to (12) on the first color correction value (FFC2_R1), the second color correction value (FFC2_G1) and the third color correction value (FFC2_B1) processed after the second FFC, to judge whether the target object is a fake finger or a real finger. In this aspect, if equation (10) to equation (12) are all satisfied, the target object is determined to be a real finger. If at least one of the equation (10) to the equation (12) is not satisfied, it is determined that the target object is a fake finger.

$$TH1 < \frac{FFC2\_R1}{FFC2\_G1} < TH2 \quad \text{Equation (10)}$$

$$TH1 < \frac{FFC2\_G1}{FFC2\_B1} < TH2 \quad \text{Equation (11)}$$

$$TH1 < \frac{FFC2\_R1}{FFC2\_B1} < TH2 \quad \text{Equation (12)}$$

In an embodiment, the preset condition may, for example, refer to the second numerical analysis method described below. The second numerical analysis method may refer to that the under-screen fingerprint sensing device 100 can continuously sense the target object twice through the fingerprint sensor 120, so that the first color pixel 211R_1, the second color pixel 211G_1 and the third color pixel 211B_1 of the pixel array of the fingerprint sensor 120 respectively output the first color original value (R1), the second color original value (G1) and the third color original value (B1) corresponding to the first sensing operation (acquiring the first image), and another first color original value (R1'), another second color original value (G1'), and another third color original value (B1') corresponding to the second sensing operation (acquiring the second image). The processor 110 may perform the same FFC (e.g., the first FFC and/or the second FFC) on the first color original value (R1), the second color original value (G1), the third color original value (B1), another first color original value, another second color original value, and another third color original value respectively, to generate a first color correction value, a second color correction value, a third color correction value, another first color correction value, another second color correction value, and another third color correction value. Next, the processor 110 may determine whether a first difference between the first color correction value and another first color correction value, a second difference between the second color correction value and another second color correction value, and a third difference between the third color correction value and another third color correction value are respectively greater than 0. If not, in step S350, the processor 110 determines that the target object is a fake finger, so as to stop using the current two fingerprint images for subsequent fingerprint analysis. If yes, in step S340, the processor 110 determines that the target object is a real finger, and the processor 110 or the central processing unit of the electronic device can perform subsequent fingerprint analysis on at least one of the two current fingerprint images. Therefore, the under-screen fingerprint sensing device 100 and the fingerprint sensing method of the present embodiment can realize the function of judging whether the target object is a real finger.

It is exemplified in the following that the processor 110 performs the aforementioned first FFC on the first color original value (R1), the second color original value (G1) and the third color original value (B1) of the first fingerprint image, respectively, and performs the first FFC on the first color original value (R1'), the second color original value (G1'), and the third color original value (B1') of the second fingerprint image respectively. The processor 110 can make judgment on the first color correction value (FFC1_R1), the second color correction value (FFC1_G1), the third color correction value (FFC1_B1) of the first fingerprint image after being processed with the first FFC, as well as the first color correction value (FFC1_R1'), the second color correction value (FFC1_G1'), and the third color correction value (FFC1_B1') of the second fingerprint image after being processed with the first FFC expressed in the following equation (13) to equation (15), to determine whether the target object is a fake finger or a real finger. In this aspect, if equation (13) to equation (15) are all satisfied, the target object is determined to be a real finger. If at least one of the equation (13) to the equation (15) is not satisfied, it is determined that the target object is a fake finger.

$$FFC1\_R1 - FFC1\_R1' > \quad \text{Equation (13)}$$

$$FFC1\_G1 - FFC1\_G1' > \quad \text{Equation (14)}$$

$$FFC1\_G1 - FFC1\_G1' > \quad \text{Equation (15)}$$

It is exemplified in the following that the processor 110 performs the aforementioned second FFC on the first color original value (R1), the second color original value (G1) and the third color original value (B1) of the first fingerprint image, respectively, and performs the second FFC on the first color original value (R1'), the second color original value (G1'), and the third color original value (B1') of the second fingerprint image respectively. The processor 110 can make judgment on the first color correction value (FFC2_R1), the second color correction value (FFC2_G1), the third color correction value (FFC2_B1) of the first fingerprint image after being processed with the second FFC, as well as the first color correction value (FFC2_R1'), the second color correction value (FFC2_G1'), and the third color correction value (FFC2_B1') of the second fingerprint image after being processed with the second FFC expressed in the following equation (16) to equation (18), to determine whether the target object is a fake finger or a real finger. In this aspect, if equation (16) to equation (18) are all satisfied, the target object is determined to be a real finger. If at least one of the equation (16) to the equation (18) is not satisfied, it is determined that the target object is a fake finger.

$$FFC2\_R1 - FFC2\_R1' > \qquad \text{Equation (16)}$$

$$FFC2\_G1 - FFC2\_G1' > \qquad \text{Equation (17)}$$

$$FFC2\_G1 - FFC2\_G1' > \qquad \text{Equation (18)}$$

It is worth noting that, in other embodiments, the processor 110 may also first perform the above-mentioned judgment through the first numerical analysis method, and if the determining result is "No", then the above-mentioned second numerical analysis method is executed to make judgment. Alternatively, the processor 110 may also first make the judgment through the second numerical analysis method described above, and if the determining result is "No", then the first numerical analysis method described above is executed to make judgment.

In addition, in other embodiments of the present disclosure, the processor 110 may further perform the above numeral analysis and calculation on the sensing results of the respective first color pixel, second color pixel and third color pixel of the pixel groups 211_1 to 211_N in the pixel array 200, and perform statistical calculation on the plurality of determining results of the pixel groups 211_1 to 211_N. In this respect, when the multiple determining results of the pixel groups 211_1 to 211_N are that the number of real fingers is greater than the first predetermined determining threshold, the final determining result is output as that the target object is a real finger. On the contrary, the output final determining result is that the target object is a fake finger.

Figure 4:
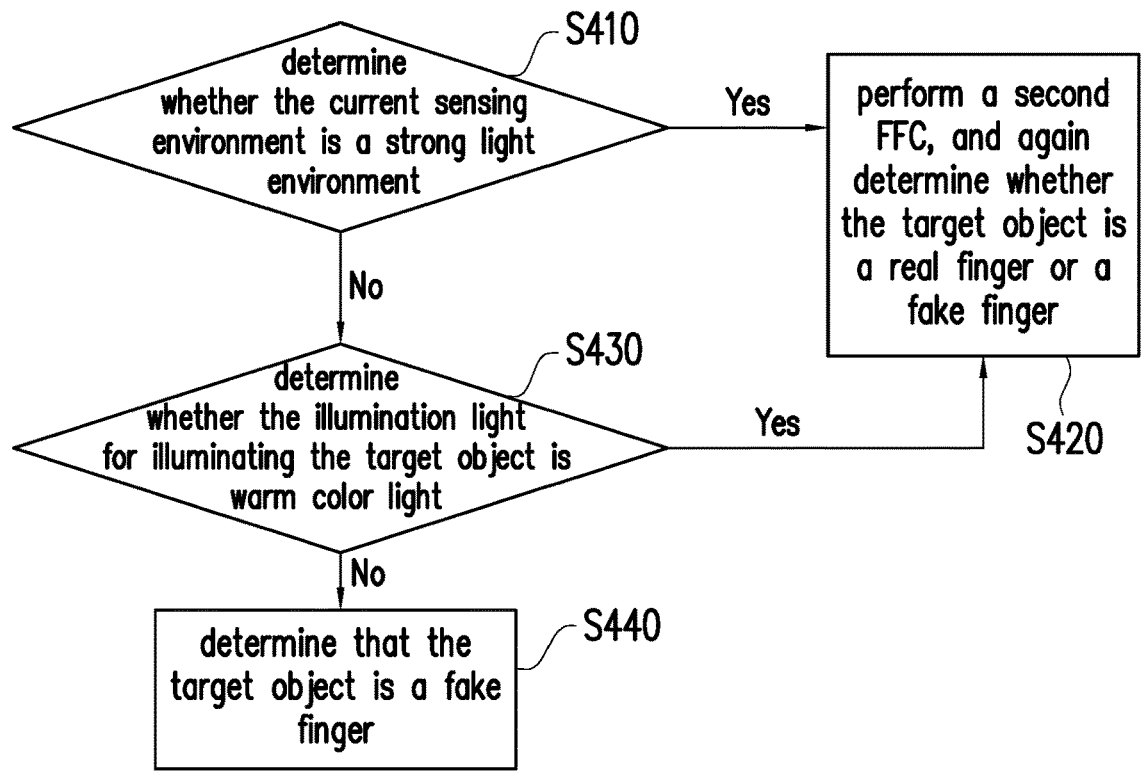
FIG. 4 is a flowchart of determining the sensing environment according to the first embodiment of the present disclosure.

FIG. 4 is a flowchart of determining the sensing environment according to the first embodiment of the present disclosure. Referring to FIG. 1 and FIG. 4, in other embodiments of the present disclosure, the under-screen fingerprint sensing device 100 may further determine whether the confirmation result of the current sensing environment is an exception after it is determined "No" in the above-mentioned step S330 (that is, steps S310 to S330 and S410 to 440 can be executed in sequence) (based on the numerical result of the first FFC), so that the processor 110 or the central processing unit of the electronic device still performs subsequent fingerprint analysis on the current fingerprint image. In step S410, the processor 110 may determine whether the current sensing environment is a strong light environment. In this aspect, the processor 110 may first perform the first FFC on the first color original value, the second color original value and the third color original value to obtain the first color correction value (FFC1_R1), the second color correction value (FFC1_G1), and the third color correction value (FFC1_B1), and the processor 110 executes the following equations (19) to (21) to determine whether the current sensing environment is a strong light environment. The processor 110 may divide the first color correction value (FFC1_R1) by the second color correction value (FFC1_G1) to obtain a seventh calculation value, and determine whether the seventh calculation value is greater than or equal to 1.2. The processor 110 may divide the third color correction value (FFC1_B1) by the second color correction value (FFC1_G1) to obtain an eighth calculation value, and determine whether the eighth calculation value is greater than or equal to 1. The processor 110 may divide the first color correction value (FFC1_R1) by the third color correction value (FFC1_B1) to obtain a ninth calculation value, and determine whether the ninth calculation value is greater than or equal to 1. In this aspect, if equation (19) to equation (21) are all satisfied, step S420 is executed. If at least one of the equation (19) to the equation (21) is not satisfied, step S430 is executed.

$$\frac{FFC1\_R1}{FFC1\_G1} \geq 1.2 \qquad \text{Equation (19)}$$

$$\frac{FFC1\_B1}{FFC1\_G1} \geq 1 \qquad \text{Equation (20)}$$

$$\frac{FFC1\_R1}{FFC1\_B1} \geq 1 \qquad \text{Equation (21)}$$

In step S430, the processor 110 may determine whether the illumination light for illuminating the target object is warm color light. It is worth noting that the warm color light may be caused by the illumination light provided by the display device or other light source elements, and the illumination light is brighter compared with the light before fingerprint sensing or because a red screen picture is displayed. However, the disclosure is not limited thereto. In this aspect, the processor 110 may first perform the first FFC on the first color original value, the second color original value and the third color original value to obtain the first color correction value (FFC1_R1), the second color correction value (FFC1_G1) and the third color correction value (FFC1_B1). Moreover, the processor 110 executes the following equation (22) to determine whether the illumination light for illuminating the target object is warm color light. In this embodiment, the processor 110 may compare whether the first color correction value (FFC1_R1) is greater than the second color correction value (FFC1_G1), and whether the second color correction value (FFC1_G1) is greater than the third color correction value (FFC1_B1). In this aspect, if the equation (22) is established, step S420 is executed. If the equation (22) is not established, step S440 is executed.

$$FFC1\_R1 > FFC1\_G1 > FFC1\_B1 \qquad \text{Equation (22)}$$

In step S420, the processor 110 determines that the result of the current sensing environment is an exception (i.e., the current sensing environment is a strong light environment or the current illumination light is a warm color light). The processor 110 may perform a second FFC on the first color original value, the second color original value and the third color original value, and again determine whether the target object is a real finger or a fake finger. In this embodiment, the processor 110 may first perform the second FFC on the first color original value, the second color original value and the third color original value to obtain the first color correction value (FFC2_R1), the second color correction value (FFC2_G1) and the third color correction value (FFC2_B1), and the processor 110 makes judgment with the above preset condition based on the numerical result of the second FFC to determine again whether the target object is a real finger or a fake finger. In an embodiment, the processor 110 may further provide relevant judgment information to the central processing unit of the electronic device, so that the central processing unit of the electronic device can perform other related functions or processing accordingly, but the disclosure is not limited thereto. In step S440, the processor 110 determines that the result of the current sensing environment is not an exceptional case, so as to determine that the target object is a fake finger.

It should be noted that, in an embodiment, the processor 110 may further perform calculation and analysis to determine the current sensing environment as described above based on the sensing results of the respective first color pixel, second color pixel and third color pixel of the pixel groups 211_1 to 211_N in the pixel array 200, and make statistical calculation on the multiple determining results of the pixel groups 211_1 to 211_N. In this aspect, when the plurality of determining results of the pixel groups 211_1 to 211_N are that the number of determining results of strong light environment is greater than the second predetermined determining threshold, the final determining result is output that the current environment is a strong light environment. When the multiple determining results of the pixel groups 211_1 to 211_N are that the number of the determining results of the warm color light is greater than the third preset determining threshold, the output final determining result is that the current illumination light is the warm color light. On the contrary, it is determined that the target object is a fake finger.

Figure 5:
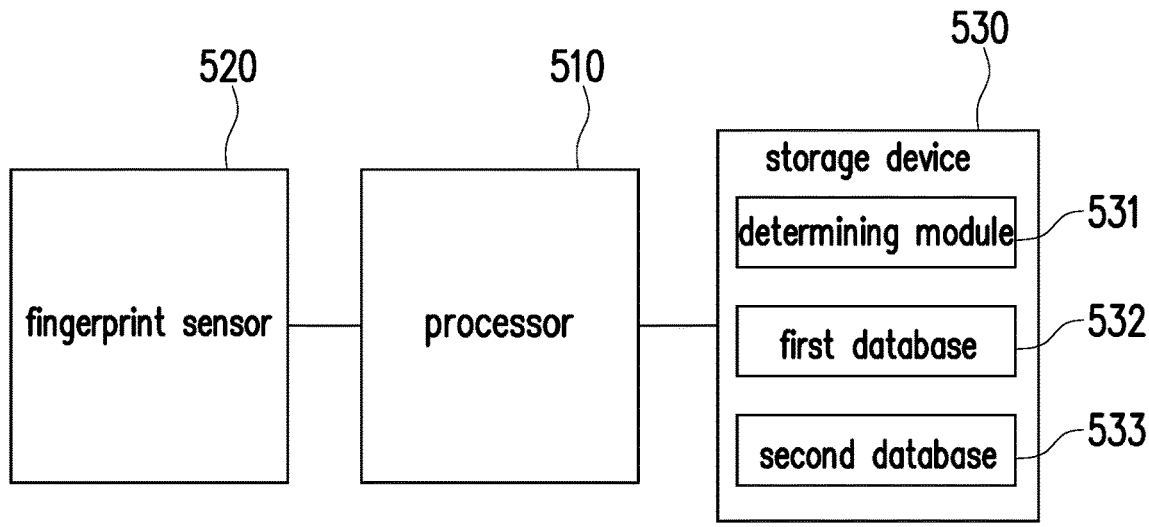
FIG. 5 is a schematic circuit diagram of an under-screen fingerprint sensing device according to another embodiment of the present disclosure.

FIG. 5 is a schematic circuit diagram of an under-screen fingerprint sensing device according to another embodiment of the present disclosure. Referring to FIG. 5, the under-screen fingerprint sensing device 500 includes a processor 510, a fingerprint sensor 520 and a storage device 530. The processor 510 is coupled to the fingerprint sensor 520 and the storage device 530. In this embodiment, the under-screen fingerprint sensing device 500 is adaptable for an electronic device (or terminal device) having a display device. It is worth noting that the relevant hardware features and implementation of the under-screen fingerprint sensing device 500 of this embodiment can be derived from the descriptions of the above-mentioned embodiments in FIG. 1 to FIG. 4. The under-screen fingerprint sensing device 500 of this embodiment may include all the technical features of the under-screen fingerprint sensing device 100 of the above-mentioned embodiment of FIG. 1. However, the storage device 530 of the under-screen fingerprint sensing device 500 of this embodiment may further store a determining module 531, a first database 532 and a second database 533. In this embodiment, the determining module 531 is a machine learning (ML) module, and may include, for example, a k-nearest neighbors (KNN) algorithm and/or a rule-based algorithm.

In this embodiment, the first database 532 may include a plurality of fake hand (finger) categories, and the second database 533 may include a plurality of real hand (finger) categories. The plurality of fake hand categories and the plurality of real hand categories may correspond to different combinations of the first color reference value, the second color reference value, and the third color reference value, respectively.

In this embodiment, these fake hand categories may, for example, include at least one corresponding to different object background colors, different color temperatures, fake fingerprint colors, or different fake hand materials in the following table 1.

TABLE 1

| Fake hand (finger) categories | Screen color temperatures | Object background colors | Fake fingerprint colors | Different fake hand materials |
|---|---|---|---|---|
| fake finger 1 | Warm color | Orange | Black | Color paper |
| fake finger 2 | Warm color | Red | Black | Color paper |
| fake finger 3 | Warm color | Yellow | Black | Color paper |
| fake finger 4 | Warm color | Brown | Black | Color paper |
| fake finger 5 | Warm color | Pink | Black | Color paper |
| fake finger 6 | cool color | Blue | Red | Color paper |
| fake finger 7 | cool color | Green | Black | Color paper |
| fake finger 8 | cool color | Purpose | Black | Color paper |
| fake finger 9 | Other | White | Red | Color paper |
| fake finger 10 | Other | Black | Black | Color paper |
| fake finger 11 | Other | Dark gray | Black | Color card |
| fake finger 12 | Other | Light gray | Black | Color card |
| fake finger 13 | Other | Bright red | Black | Color card |
| fake finger 14 | Other | Dard red | Black | Color card |
| fake finger 15 | Other | High-grade gray | Black | Color card |

In this embodiment, these real hand categories may, for example, include at least one corresponding to different finger pressing forces, different finger coverage areas, different finger sensing environments or different finger states in the following Table 2.

TABLE 2

| Real hand (finger) categories | Finger pressing force | finger coverage areas | finger sensing environment |
|---|---|---|---|
| Real finger 1 | Normal pressing force | 100% | Normal indoor environment |
| Real finger 2 | Normal pressing force | 50% | Normal indoor environment |
| Real finger 3 | Normal pressing force | 100% | Dark room |
| Real finger 4 | Normal pressing force | 50% | Dark room |
| Real finger 5 | Low pressing force | 100% | Normal indoor environment |
| Real finger 6 | Low pressing force | 50% | Normal indoor environment |
| Real finger 7 | Low pressing force | 100% | Dark room |
| Real finger 8 | Low pressing force | 50% | Dark room |
| Real finger 9 | High pressing force | 100% | Normal indoor environment |
| Real finger 10 | High pressing force | 50% | Normal indoor environment |
| Real finger 11 | High pressing force | 100% | Dark room |
| Real finger 12 | High pressing force | 50% | Dark room |
| Real finger 13 | Normal pressing force | 100% | Strong light environment |
| Real finger 14 | Normal pressing force | 50% | Strong light environment |
| Real finger 15 | wet finger | 100% | Dark room |
| Real finger 16 | wet finger | 50% | Dark room |
| Real finger 17 | wet finger | 100% | Normal indoor environment |
| Real finger 18 | wet finger | 50% | Normal indoor environment |
| Real finger 19 | Dirty finger | 100% | Dark room |
| Real finger 20 | Clean finger | 50% | Dark room |
| Real finger 21 | Low light (20%) | 100% | Normal indoor environment |
| Real finger 22 | Low light (20%) | 50% | Normal indoor environment |
| Real finger 23 | Dimmed strong light (20K lux) | 100% | Strong light environment |
| Real finger 24 | Dimmed strong light (20K lux) | 50% | Strong light environment |

Figure 6:
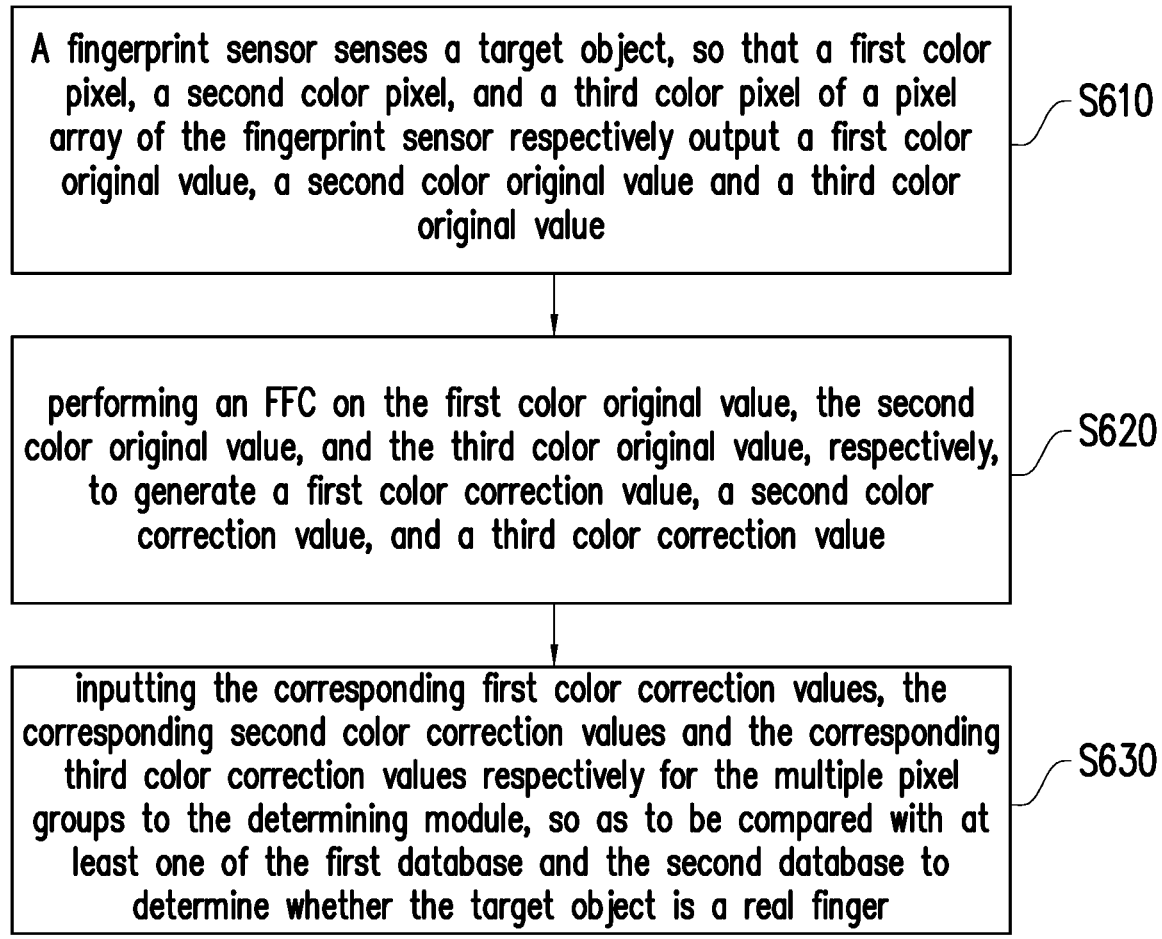
FIG. 6 is a flowchart of a fingerprint sensing method according to a second embodiment of the present disclosure.

FIG. 6 is a flowchart of a fingerprint sensing method according to a second embodiment of the present disclosure. Referring to FIG. 5 and FIG. 6, the under-screen fingerprint sensing device 500 can perform the following steps S610 to S630 to realize the anti-counterfeiting function. In step S610, when the fingerprint sensor 520 senses the target object, a plurality of pixel groups of the pixel array of the fingerprint sensor 520 (for example, a plurality of first color pixels 211R_1 to 211R_N, a plurality of second color pixels 211G_1 to 211G_N and a plurality of third color pixels 211B_1 to 211B_N of the pixel groups 211_1 to 211_N of the pixel array 200 of FIG. 2) are used respectively to output a plurality of first color original values (such as R1 to RN), a plurality of second color original values (such as G1 to GN) and a plurality of third color original values (such as B1 to BN)). In step S620, the processor 510 may perform FFC on the first color original values (e.g., R1 to RN), the second color original values (e.g., G1 to GN), and the third color original values (e.g., B1 to BN), respectively, to generate a plurality of first color original values, a plurality of second color correction values, and a plurality of third color correction values. In step S630, the processor 510 may input the first color correction values, the second color correction values and the third color correction values to the determining module 531, so as to be compared with at least one of the first database 532 and the second database 533 to determine whether the target object is a real finger. Therefore, the under-screen fingerprint sensing device 500 and the fingerprint sensing method of this embodiment can realize the function of judging whether the target object is a real finger.

In the aforementioned step S620, the processor 510 may perform the first FFC as expressed in equation (1) to equation (3) on the plurality of first color original values (e.g., R1 to RN), plurality of second color original values (e.g., G1 to GN), and plurality of third color original values (e.g., B1 to BN) respectively, to generate a plurality of first color correction values (e.g., FFC1_R1 to FFC1_RN), a plurality of second color correction values (e.g., FFC1_G1 to FFC1_GN) and a plurality of third color correction values (e.g., FFC1_B1 to FFC1_BN). Alternatively, in an embodiment, the processor 510 may perform the second FFC as expressed in the equation (4) to equation (6) on a plurality of first color original values (for example, R1 to RN), a plurality of second color original values (for example, G1 to GN), and a plurality of third color original values (for example, B1 to BN), respectively, to generate a plurality of first color correction values (e.g., FFC2_R1 to FFC2_RN), a plurality of second color correction values (e.g., FFC2_G1 to FFC2_GN) and a plurality of third color correction values (e.g., FFC2_B1 to FFC2_BN).

In the aforementioned step S630, the processor 510 may execute the KNN algorithm in the determining module 531 to determine whether the target object is a real finger according to the classification result of the first color correction values, the second color correction values and the third color correction values corresponding to at least one of the first database 532 and the second database 533 and output through the KNN algorithm. In this aspect, the processor 510 may execute the KNN algorithm in the determining module 531 to determine the first color correction values, the second color correction values and the third color correction values are the closest to which one of the plurality of real and fake hand classification results in at least one of the first database 532 and the second database 533, and the determining module 531 can directly output the determining result.

Alternatively, the processor 510 may execute the rule-based algorithm in the determining module 531 to perform counting on a plurality of real-hand scores that are output from the first color correction values, the second color correction values, and the third color correction values through the rule-based algorithm and corresponding to at least one of the first database 532 and the second database 533, to determine whether the target object is a real finger. In this aspect, the processor 510 may determine whether the plurality of real-hand scores exceeds a preset score threshold, and count the number of real-hand scores exceeding the preset score threshold. Next, the processor 510 may determine whether the number of real-hand scores exceeding the preset score threshold is greater than the preset number threshold to determine the final determining result of the real and fake fingers. If the number of real-hand scores exceeding the preset score threshold is greater than the preset number threshold, the processor 510 determines that the target object is a real finger. Conversely, if the number of real-hand scores exceeding the preset score threshold is less than or equal to the preset number threshold, the processor 510 determines that the target object is a fake finger. The processor 510 may execute the rule-based algorithm in the determining module 531 to classify the first color correction values, the second color correction values and the third color correction values into a plurality of real and fake hand classification results in at least one of the first database 532 and the second database 533, and the determining module 531 can directly output the determining result according to the one with the largest count value among the real and fake hand classification results.

Figure 7:
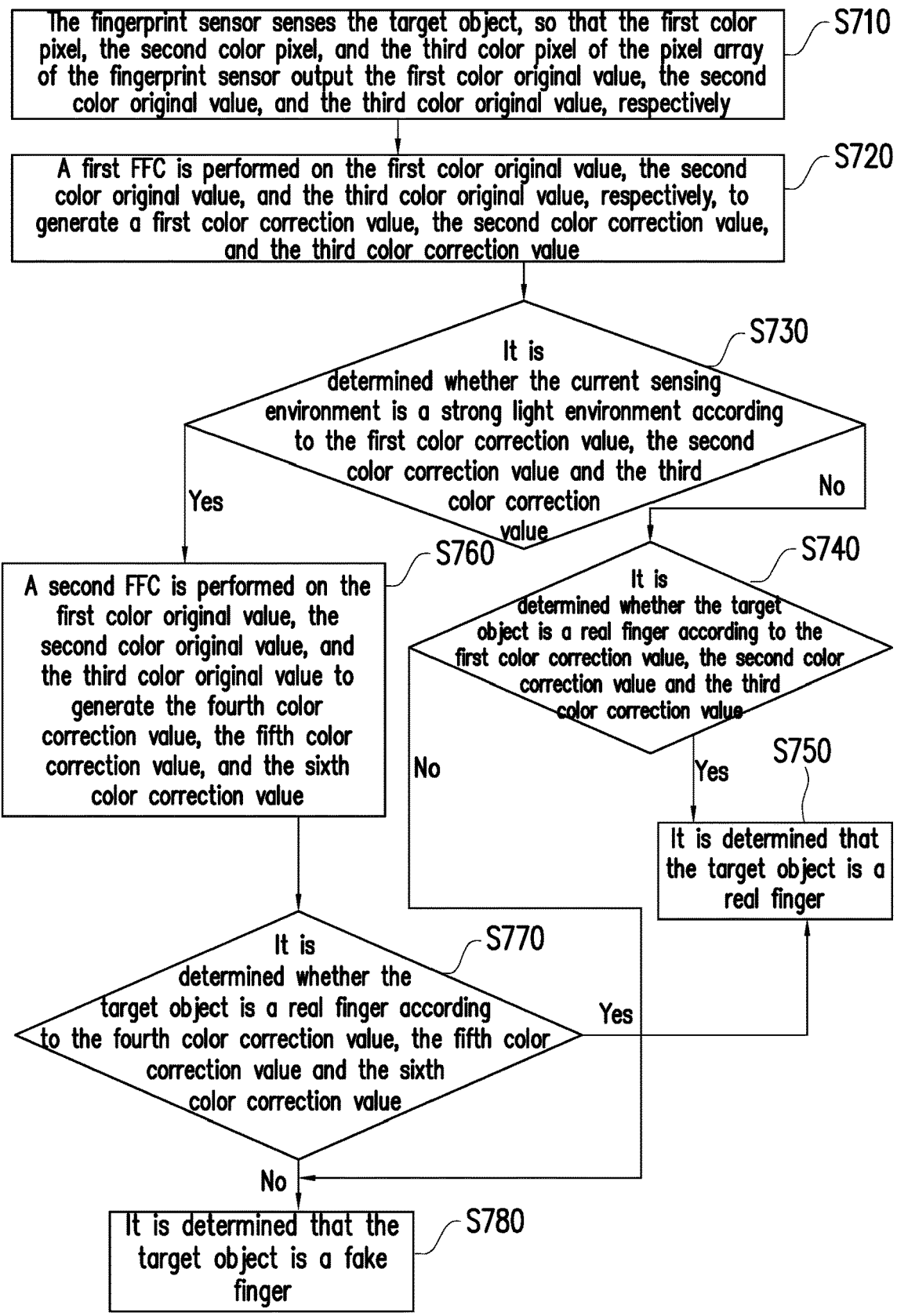
FIG. 7 is a flowchart of a fingerprint sensing method according to a third embodiment of the present disclosure.

FIG. 7 is a flowchart of a fingerprint sensing method according to a third embodiment of the present disclosure. Referring to FIG. 5 and FIG. 7, the under-screen fingerprint sensing device 500 may perform the following steps S710 to S780 to implement the anti-counterfeiting function. In step S710, the under-screen fingerprint sensing device 500 can sense the target object through the fingerprint sensor 520, so that the first color pixel, the second color pixel, and the third color pixel of the pixel array (such as the pixel array 200 in FIG. 2) of the fingerprint sensor 520 output the first color original value (R1), the second color original value (G1), and the third color original value (B1), respectively. In step S720, the processor 510 may perform a first FFC on the first color original value (R1), the second color original value (G1), and the third color original value (B1), respectively, to generate a first color correction value (FFC1_R1), the second color correction value (FFC1_G1), and the third color correction value (FFC1_B1). In this embodiment, the processor 510 may perform the first FFC as expressed in the above equation (1) to equation (3). In step S730, the processor 510 may determine whether the current sensing environment is a strong light environment according to the first color correction value (FFC1_R1), the second color correction value (FFC1_G1) and the third color correction value (FFC1_B1). In this embodiment, the processor 510 can perform the calculations as expressed in the above equation (19) to equation (21) to determine whether the current sensing environment is a strong light environment.

In an embodiment, a plurality of pixel groups of the pixel array of the fingerprint sensor 520 can output a plurality of first color original values, a plurality of second color original values, and a plurality of third color original values, respectively, and the processor 510 performs a first FFC on the first color original values, the second color original values, and the third color original values, respectively, to generate a plurality of first color correction values, a plurality of second color correction values, and a plurality of third color correction values. The processor 510 can execute the KNN algorithm in the determining module 531 to determine whether the current sensing environment is a strong light environment (e.g., the finger sensing environments of real fingers 13, 14, 23, and 24 in Table 2) according to the classification results of the first color correction values, the second color correction values and the third color correction values that are output through the KNN algorithm and corresponding to the second database 533. Alternatively, the processor 510 may also execute the rule-based algorithm in the determining module 531 to perform counting on a plurality of strong light environment scores that are output from the first color correction values, the second color correction values, and the third color correction values through the rule-based algorithm and corresponding to the second database 533, to determine whether the current sensing environment is a strong light environment (for example, the finger sensing environment of real fingers 13, 14, 23, and 24 in Table 2).

If yes, the processor 510 executes step S740. If not, the processor 510 executes step S760. In step S740, the processor 510 may determine whether the target object is a real finger according to the first color correction value (FFC1_R1), the second color correction value (FFC1_G1) and the third color correction value (FFC1_R1). In this embodiment, the processor 510 may perform the calculation as expressed in the above equation (7) to equation (9) to determine whether the target object is a real finger. Alternatively, in an embodiment, multiple pixel groups of the pixel array of the fingerprint sensor 520 may output a plurality of first color original values, a plurality of second color original values, and a plurality of third color original values, respectively, and processor 510 performs a first FFC on the first color original values, the second color original values, and the third color original values, respectively, to generate a plurality of first color correction values, a plurality of second color correction values, and a plurality of first color correction values. The processor 510 may perform step S630 in the above-mentioned embodiment of FIG. 6 on the first color correction values, the second color correction values and the third color correction values to determine whether the target object is a real finger. If yes, in step S750, the processor 510 determines that the target object is a real finger, and the processor 510 or the central processing unit of the electronic device can perform subsequent fingerprint analysis on the current fingerprint image. If not, in step S780, the processor 510 determines that the target object is a fake finger.

In step S760, the processor 510 may perform a second FFC on the first color original value (R1), the second color original value (G1), and the third color original value (B1) to generate the fourth color correction value (FFC2_R1), the fifth color correction value (FFC2_G1), and the sixth color correction value (FFC2_B1). In this embodiment, the processor 510 may perform the second FFC as expressed in the above equation (4) to equation (6).

In step S770, the processor 510 may determine whether the target object is a real finger according to the fourth color correction value (FFC2_R1), the fifth color correction value (FFC2_G1) and the sixth color correction value (FFC2_B1). In this embodiment, the processor 510 may perform the calculation as expressed in the above equation (10) to equation (12) to determine whether the target object is a real finger. Alternatively, in an embodiment, multiple pixel groups of the pixel array of the fingerprint sensor 520 may output the plurality of first color original values, plurality of second color original values, and plurality of third color original values, respectively, and processor 510 performs a second FFC on the first color original values, the second color original values, and the third color original values, respectively, to generate the plurality of fourth color correction values, plurality of fifth color correction values, and plurality of sixth color correction values. The processor 510 may perform step S630 in the above-mentioned embodiment of FIG. 6 on the fourth color correction values, the fifth color correction values and the sixth color correction values to determine whether the target object is a real finger. If yes, in step S750, the processor 510 determines that the target object is a real finger, and the processor 510 or the central processing unit of the electronic device can perform subsequent fingerprint analysis on the current fingerprint image. If not, in step S780, the processor 510 determines that the target object is a fake finger. Therefore, the under-screen fingerprint sensing device 500 and the fingerprint sensing method of this embodiment can realize the function of judging whether the target object is a real finger.

Figure 8:
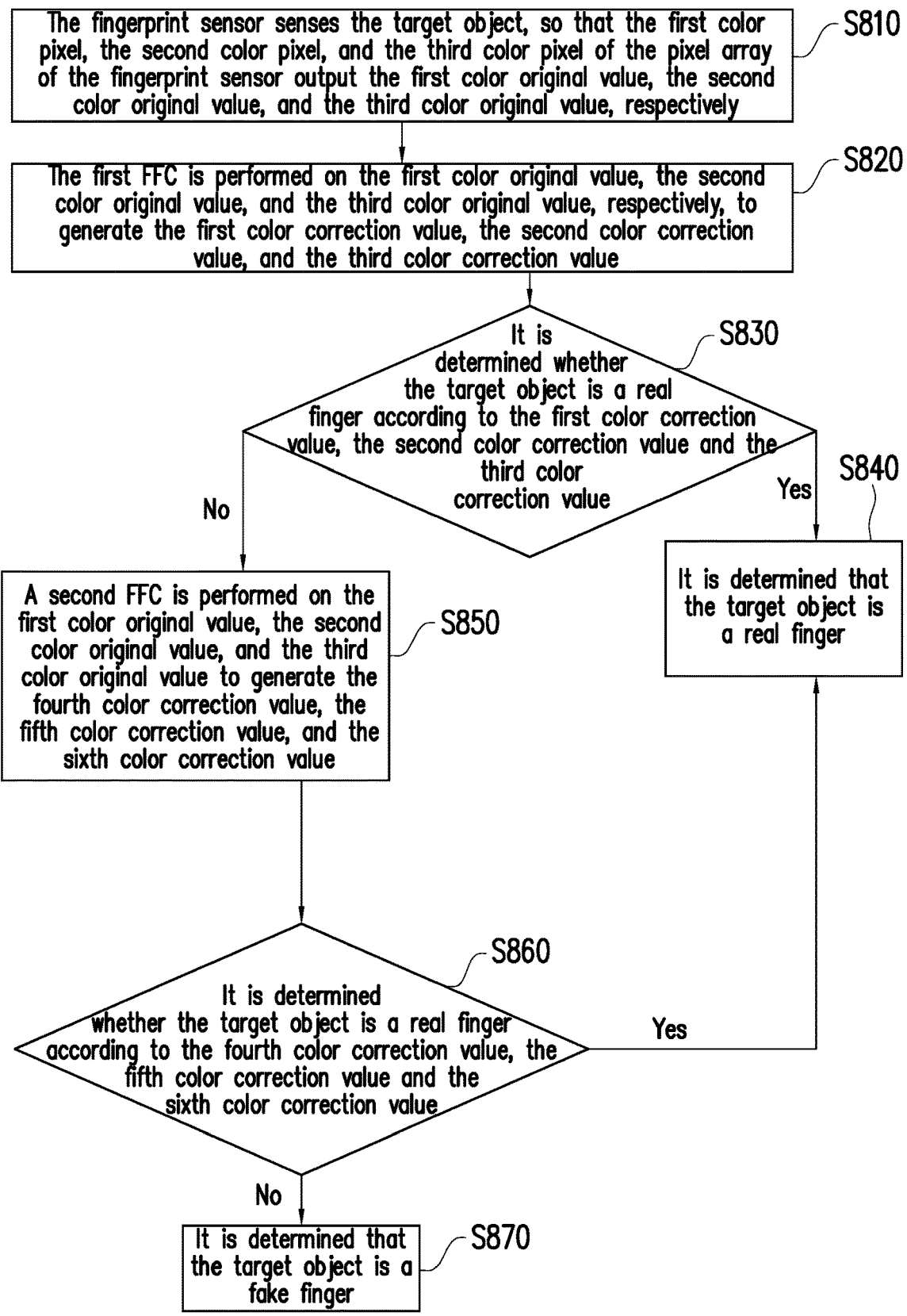
FIG. 8 is a flowchart of a fingerprint sensing method according to a fourth embodiment of the present disclosure.

FIG. 8 is a flowchart of a fingerprint sensing method according to a fourth embodiment of the present disclosure. Referring to FIG. 5 and FIG. 8, the under-screen fingerprint sensing device 500 can perform the following steps S810 to S870 to implement the anti-counterfeiting function. In step S810, the under-screen fingerprint sensing device 500 can sense the target object through the fingerprint sensor 520, so that the first color pixel, the second color pixel and the second color pixel of the pixel array (such as the pixel array 200 in FIG. 2) of the fingerprint sensor 520 respectively output the first color original value (R1), the second color original value (G1), and the third color original value (B1), respectively. In step S820, the processor 510 may perform the first FFC on the first color original value (R1), the second color original value (G1), and the third color original value (B1), respectively, to generate the first color correction value (FFC1_R1), the second color correction value (FFC1_G1), and the third color correction value (FFC1_B1). In this embodiment, the processor 510 may perform the first FFC as expressed in the above equation (1) to equation (3).

In step S830, the processor 510 may determine whether the target object is a real finger according to the first color correction value (FFC1_R1), the second color correction value (FFC1_G1) and the third color correction value (FFC1_B1). In this embodiment, the processor 510 can perform calculation as expressed in the above equation (7) to equation (9) to determine whether the target object is a real finger. Alternatively, in an embodiment, multiple pixel groups of the pixel array of the fingerprint sensor 520 may output the plurality of first color original values, the plurality of second color original values, and the plurality of third color original values, respectively, and processor 510 performs a first FFC on the first color original values, the second color original values, and the third color original values, respectively, to generate a plurality of first color correction values, a plurality of second color correction values, and a plurality of third color correction values. The processor 510 may perform step S630 in the above-mentioned embodiment of FIG. 6 on the first color correction values, the second color correction values and the third color correction values to determine whether the target object is a real finger. If yes, in step S840, the processor 510 determines that the target object is a real finger, and the processor 510 or the central processing unit of the electronic device can perform subsequent fingerprint analysis on the current fingerprint image. If not, the processor 510 executes step S850.

In step S850, the processor 510 may perform a second FFC on the first color original value (R1), the second color original value (G1), and the third color original value (B1) to generate the fourth color correction value (FFC2_R1), the fifth color correction value (FFC2_G1), and the sixth color correction value (FFC2_B1). In this embodiment, the processor 510 may perform the second FFC as expressed in the above equation (4) to equation (6).

In step S860, the processor 510 may determine whether the target object is a real finger according to the fourth color correction value (FFC2_R1), the fifth color correction value (FFC2_G1) and the sixth color correction value (FFC2_B1). In this embodiment, the processor 510 may perform calculation as expressed in the above equation (10) to equation (12) to determine whether the target object is a real finger. Alternatively, in an embodiment, multiple pixel groups of the pixel array of the fingerprint sensor 520 may respectively output the plurality of first color original values, the plurality of second color original values, and the plurality of third color original values, respectively, and the processor 510 performs a second FFC on the first color original values, the second color original values, and the third color original values, respectively, to generate the plurality of fourth color correction values, the plurality of fifth color correction values, and the plurality of sixth color correction values. The processor 510 may perform step S630 in the above-mentioned embodiment of FIG. 6 on the fourth color correction values, the fifth color correction values and the sixth color correction values to determine whether the target object is a real finger. If yes, in step S840, the processor 510 determines that the target object is a real finger, and the processor 510 or the central processing unit of the electronic device can perform subsequent fingerprint analysis on the current fingerprint image. If not, in step S850, the processor 510 determines that the target object is a fake finger, so as to stop using the current fingerprint image for subsequent fingerprint analysis. Therefore, the under-screen fingerprint sensing device 500 and the fingerprint sensing method of this embodiment can realize the function of judging whether the target object is a real finger.

In addition, in another embodiment, when the processor 510 determines that the target object is a real finger in step S840, the processor 510 may further input the first color correction value, the second color correction value and the third color correction value to the determining module 531, or input the fourth color correction value, the fifth color correction value and the sixth color correction value to the determining module 531, so as to be compared with the second database 533 to judge the state of the target object. The comparison method may be, for example, an analysis method in which the processor 510 executes the KNN algorithm in the determining module 531 described in step S630 in the embodiment of FIG. 6 or an analysis method in the rule-based algorithm in the determining module 531. In this aspect, the state of the target object may be, for example, a determining result of at least one of the real hand (finger) classification, the finger pressing condition, the finger coverage area, and the finger sensing environment as shown in Table 2 above. The processor 510 may use the information on the state of the target object in subsequent fingerprint identification, fingerprint image processing or other application programs.

To sum up, the under-screen fingerprint sensing device and fingerprint sensing method of the present disclosure can use one of two FFCs to correct a plurality of color original values obtained by the fingerprint sensor, so as to effectively determine whether the currently sensed target object is a fake finger or a real finger. In addition, the means for judging real and fake fingers adopted by the under-screen fingerprint sensing device and fingerprint sensing method of the present disclosure may further be realized through numerical analysis and machine learning, so that the under-screen fingerprint sensing device can provide an anti-counterfeiting function with high degree of accuracy.

Although the present disclosure has been disclosed above with embodiments, it is not intended to limit the present disclosure. Anyone with ordinary knowledge in the technical field can make some changes and modifications without departing from the spirit and scope of the present disclosure. Therefore, the scope to be protected by the present disclosure shall be subjected to the scope of the appended claims.

What is claimed is:

1. An under-screen fingerprint sensing device, adaptable for an electronic equipment with a display device, comprising:
   a fingerprint sensor, disposed under the display device, and the fingerprint sensor having a pixel array, wherein the pixel array has a first color pixel, a second color pixel and a third color pixel, when the fingerprint sensor senses a target object, the first color pixel, the second color pixel and the third color pixel respectively output a first color original value, a second color original value and a third color original value; and
   a processor, coupled to the fingerprint sensor, wherein the processor performs a first flat-filed correction (FFC) on the first color original value, the second color original value and the third color original value to generate a first color correction value, a second color correction value and a third color correction value, and the processor determines whether the target object is a real finger according to the first color correction value, the second color correction value and the third color correction value,
   wherein when the processor determines that the target object is an unreal finger according to the first color correction value, the second color correction value and the third color correction value, the processor performs a second FFC on the first color original value, the second color original value and the third color original value, to generate a fourth color correction value, a fifth color correction value, and a sixth color correction value, and the processor determines again whether the target object is the real finger according to the fourth color correction value, the fifth color correction value and the sixth color correction value.

2. The under-screen fingerprint sensing device according to claim 1, wherein the first FFC comprises:
   the processor performing subtraction on the first color original value and a first low reference value to obtain a first calculation value, and the processor performing subtraction on a first high reference value and the first low reference value to obtain a second calculation value, wherein the processor divides the first calculation value by the second calculation value to obtain the first color correction value,
   the processor performing subtraction on the second color original value and a second low reference value to obtain a third calculation value, and the processor performing subtraction on a second high reference value and the second low reference value to obtain a fourth calculation value, wherein the processor divides the third calculation value by the fourth calculation value to obtain the second color correction value, the processor performing subtraction on the third color original value and a third low reference value to obtain a fifth calculation value, and the processor performing subtraction on a third high reference value and the third low reference value to obtain a sixth calculation value, wherein the processor divides the fifth calculation value by the sixth calculation value to obtain the third color correction value.

3. The under-screen fingerprint sensing device according to claim 2, wherein the first high reference value, the second high reference value and the third high reference value are three first analog to digital converter (ADC) values respectively corresponding to a first color, a second color and a third color and generated after the fingerprint sensor senses a standard skin-colored object.

4. The under-screen fingerprint sensing device according to claim 2, wherein the first low reference value, the second low reference value and the third low reference value are three second ADC values respectively corresponding to a first color, a second color and a third color and generated after the fingerprint sensor senses a standard black object.

5. The under-screen fingerprint sensing device according to claim 1, wherein the processor determines whether the target object is the real finger according to whether a first value obtained through dividing the first color correction value by the second color correction value, a second value obtained through dividing the second color correction value by the third color correction value, and a third value obtained through dividing the first color correction value by the third color correction value are respectively greater than a first threshold and less than a second threshold.

6. The under-screen fingerprint sensing device according to claim 5, wherein the first threshold is 0.8 and the second threshold is 1.2.

7. The under-screen fingerprint sensing device according to claim 1, wherein the processor inputs the first color correction value, the second color correction value and the third color correction value to a determining module so as to be compared with a first database, to determine whether the target object is the real finger.

8. The under-screen fingerprint sensing device according to claim 7, wherein the determining module comprises a K-nearest neighbors (KNN) algorithm, and the processor inputs a plurality of first color correction values, a plurality of second color correction values and a plurality of third color correction values of a plurality of pixel groups into the determining module, so that the determining module outputs classification results of the values of the pixel groups in the first database, to determine whether the target object is the real finger.

9. The under-screen fingerprint sensing device according to claim 7, wherein the determining module comprises a rule-based algorithm, and the processor inputs a plurality of first color correction values, a plurality of second color correction values and a plurality of third color correction values of a plurality of pixel groups into the determining module, so that the determining module outputs counting results of the values of the pixel groups in the first database, to determine whether the target object is the real finger.

10. The under-screen fingerprint sensing device according to claim 1, wherein the second FFC comprises:
the processor performing subtraction on the first color original value and a fourth low reference value to obtain a seventh calculation value, and the processor performing subtraction on a fourth high reference value and the fourth low reference value to obtain an eighth calculation value, wherein the processor divides the seventh calculation value by the eighth calculation value to obtain the fourth color correction value, the processor performing subtraction on the second color original value and a fifth low reference value to obtain a ninth calculation value, and the processor performing subtraction on a fifth high reference value and the fifth low reference value to obtain a tenth calculation value, wherein the processor divides the ninth calculation value by the tenth calculation value to obtain the second color correction value, the processor performing subtraction on the third color original value and a sixth low reference value to obtain an eleventh calculation value, and the processor performing subtraction on a sixth high reference value and the sixth low reference value to obtain a twelfth calculation value, wherein the processor divides the eleventh calculation value by the twelfth calculation value to obtain the third color correction value.

11. The under-screen fingerprint sensing device according to claim 10, wherein the fourth high reference value, the fifth high reference value and the sixth high reference value are three third ADC values respectively corresponding to a first color, a second color and a third color and generated after the fingerprint sensor senses a standard white object.

12. The under-screen fingerprint sensing device according to claim 10, wherein the fourth low reference value, the fifth low reference value and the sixth low reference value are three second ADC values respectively corresponding to a first color, a second color and a third color and generated after the fingerprint sensor senses a standard black object.

13. The under-screen fingerprint sensing device according to claim 1, wherein the processor determines whether a fourth value obtained through dividing the fourth color correction value by the fifth color correction value, a fifth value obtained through dividing the fifth color correction value by the sixth color correction value, and a sixth value obtained through dividing the fourth color correction value by the sixth color correction value are greater than a third threshold and less than a fourth threshold, respectively, to determine whether the target object is the real finger.

14. The under-screen fingerprint sensing device according to claim 13, wherein the third threshold is 0.8 and the fourth threshold is 1.2.

15. The under-screen fingerprint sensing device according to claim 1, wherein the processor inputs the fourth color correction value, the fifth color correction value and the sixth color correction value into a determining module so as to be compared with a first database, to determine whether the target object is the real finger.

16. The under-screen fingerprint sensing device according to claim 15, wherein the determining module comprises a KNN algorithm, and the processor inputs a plurality of fourth color correction values, a plurality of fifth color correction values and a plurality of sixth color correction values of a plurality of pixel groups into the determining module, so that the determining module outputs classification results of the values of the pixel groups in the first database, to determine whether the target object is the real finger.

17. The under-screen fingerprint sensing device according to claim 15, wherein the determining module comprises a rule-based algorithm, and the processor inputs a plurality of fourth color correction values, a plurality of fifth color correction values and a plurality of sixth color correction values of a plurality of pixel groups into the determining module, so that the determining module outputs counting results of the values of the pixel groups in the first database, to determine whether the target object is the real finger.

18. The under-screen fingerprint sensing device according to claim 1, wherein when the processor determines that the target object is the real finger, the processor inputs the first color correction value, the second color correction value and the third color correction value to a determining module, or inputs the fourth color correction value, the fifth color correction value and the sixth color correction value to the determining module so as to be compared with a second database, to determine a target object state of the target object.

19. The under-screen fingerprint sensing device according to claim 18, wherein the determining module comprises a KNN algorithm, the processor inputs a plurality of first color correction values, a plurality of second color correction values and a plurality of third color correction values of a plurality of pixel groups to the determining module, or inputs a plurality of fourth color correction values, a plurality of fifth color correction values and a plurality of sixth color correction values of the plurality of pixel groups to the determining module, so that the determining module outputs classification results of the values of the pixel groups in the second database, to determine the target object state of the target object.

20. The under-screen fingerprint sensing device according to claim 18, wherein the determining module comprises a rule-based algorithm, the processor inputs a plurality of first color correction values, a plurality of second color correction values and a plurality of third color correction values of a plurality of pixel groups to the determining module, or inputs a plurality of fourth color correction values, a plurality of fifth color correction values and a plurality of sixth color correction values of the plurality of pixel groups to the determining module, so that the determining module outputs classification results of the values of the pixel groups in the second database, to determine the target object state of the target object.

21. The under-screen fingerprint sensing device according to claim 1, wherein the first color pixel, the second color pixel and the third color pixel respectively are a red color sensing pixel, a green color sensing pixel and a blue color sensing pixel.

22. The under-screen fingerprint sensing device according to claim 1, wherein the first color pixel, the second color pixel and the third color pixel respectively comprise a red color filter, a green color filter and a blue color filter.

23. A fingerprint sensing method, comprising:
when a fingerprint sensor senses a target object, a first color pixel, a second color pixel, and a third color pixel of a pixel array of the fingerprint sensor are respectively used to output a first color original value, a second color original value and a third color original value;
performing a first FFC on the first color original value, the second color original value, and the third color original value, to generate a first color correction value, a second color correction value, and a third color correction value;
determining whether the target object is a real finger according to the first color correction value, the second color correction value and the third color correction value;
when the processor determines that the target object is an unreal finger according to the first color correction value, the second color correction value and the third color correction value, a second FFC is performed on the first color original value, the second color original value and the third color original value, to generate a fourth color correction value, a fifth color correction value, and a sixth color correction value; and
determining again whether the target object is the real finger according to the fourth color correction value, the fifth color correction value and the sixth color correction value.

\* \* \* \* \*